(12) United States Patent
Oh

(10) Patent No.: US 7,916,792 B2
(45) Date of Patent: Mar. 29, 2011

(54) APPARATUS AND METHOD FOR VLD BUFFER MANAGEMENT

(75) Inventor: Jun Hwan Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 1373 days.

(21) Appl. No.: 11/030,085

(22) Filed: Jan. 7, 2005

(65) Prior Publication Data

US 2005/0152455 A1    Jul. 14, 2005

(30) Foreign Application Priority Data

Jan. 9, 2004 (KR) .................. 10-2004-0001688

(51) Int. Cl.
*H04N 7/12* (2006.01)
*H04N 11/02* (2006.01)
*H04N 11/04* (2006.01)
(52) U.S. Cl. .............................. 375/240.23; 375/240.25
(58) Field of Classification Search ............. 375/240.23, 375/240.25
See application file for complete search history.

(56) References Cited

U.S. PATENT DOCUMENTS

| | | | |
|---|---|---|---|
| 5,343,195 A * | 8/1994 | Cooper ........................ | 341/67 |
| 5,491,480 A * | 2/1996 | Jan et al. ..................... | 341/67 |
| 5,623,311 A * | 4/1997 | Phillips et al. ............. | 375/240.25 |
| 5,874,995 A * | 2/1999 | Naimpally et al. ........ | 375/240.25 |
| 6,324,306 B1 | 11/2001 | Natsume | |
| 6,573,846 B1 * | 6/2003 | Trivedi et al. .............. | 341/67 |

* cited by examiner

*Primary Examiner* — Marsha D Banks Harold
*Assistant Examiner* — Chikaodili E Anyikire
(74) *Attorney, Agent, or Firm* — Birch, Stewart, Kolasch & Birch, LLP

(57) ABSTRACT

Disclosed is a management apparatus and method of 32-bit double VLD buffers capable of reading a bitstream for video decoding in a digital TV receiver in a predetermined bit data unit length. Particularly, the first VLD buffer is used for directly storing an input stream in bytes, and the second VLD buffer is used for reading and storing the bitstream from the first VLD buffer, reading the bitstream with the required bit length of the VLD by bit unit, and outputting it to the VLD. As a result, 32-bit data can be processed at once. In addition, the double VLD buffer structure also reduces the number of accesses to the VLD buffer and thus, the repetitive memory access procedure can be simplified for the VLD.

17 Claims, 4 Drawing Sheets

APPARATUS AND METHOD FOR VLD BUFFER MANAGEMENT

This application claims the benefit of the Korean Patent Application No. 10-2004-0001688, filed on Jan. 9, 2004, which is hereby incorporated by reference as if fully set forth herein.

BACKGROUND OF THE INVENTION

1. Field of the Invention

The present invention relates to a VLD (Variable Length Decoder) buffer management processing a bitstream for video decoding in a digital TV receiver, and more particularly, to a management apparatus and method of 32-bit double VLD buffers capable of reading a bitstream in a predetermined bit data unit length.

2. Background of the Related Art

In general, video data compression is a key technology in multimedia applications. Particularly, a VLC (Variable Length Coding) has been the most widely used data compression technique adapting data compression standards, such as JPEC (Joint Photographic Coding Experts Group), MPEG (Moving Picture Experts Group) and other image data compression standards. The VCL is used for decoding a variable length coded data.

For instance, the VLC is used for a station that broadcasts a digital television signal to compress video data, and the VLD (Variable Length Decoding) is used for a digital TV receiver to decode the variable length coded data. In other words, the data being received through the digital TV receiver is converted into a bitstream through channel demodulation. Among them a video bitstream is outputted to a video decoder, and an audio stream is outputted to an audio decoder. It is the video decoder that includes a variable length decoder.

The VLC reduces or limits the total number of bits by assigning more bits to rarely occurring values and less bits to frequently occurring values. During the variable length coding the data are assigned with different bits from each other according to data symbols.

Therefore, to decode the variable length coded data at the VLD of the digital TV receiver, it is necessary to find an appropriate code word for the data symbol.

To this end, the VLD should read a bitstream data by bit unit.

A VLD buffer is installed at the front end of the VLD. The VLD buffer reads an input bitstream by byte unit, and converts the data unit into a bit unit before outputting it to the VLD.

Traditionally an 8-bit VLD buffer was used to store an input bitstream by byte unit and output in bit unit.

Because a data to be processed was inputted from a bitstream by byte unit, the VLD buffer management was relatively easy. When processing the value of a bit, however, the overhead on the system was increased especially at a byte memory boundary. That is, if the 1-byte VLD buffer has no bitstream to be read by the VLD, data in the 1-byte VLD buffer are outputted to the VLD at first, and a new input bitstream is stored and outputted to the VLD, resultantly increasing the overhead.

FIG. 1 is a diagram illustrating a related art 1-byte VLD buffer system in which a bitstream is read by byte unit and outputted in bit unit. In the drawing, totbitoffset is a pointer to read an input bitstream in the VLD buffer by bit unit. The totbitoffset can be obtained by counting the bitstream by bit unit from the beginning.

To read a bitstream in byte unit through the 1-byte VLD buffer, a byte pointer, such as byteoffset in FIG. 1, is needed on the bitstream. The byteoffset is a byte pointer including the totbitoffset and obtained by dividing the totbitoffset value by 8. Also, bitoffset indicates a position of the totbitoffset in bit unit that is counted from the byte where the byteoffset is positioned. The bitoffset is obtained by dividing the totbitoffset value by 8 and corresponds to the bit length to be read on the byte. In other words, if the bitoffset value in FIG. 1 points '4', it means that previous 4-bit data in the VLD buffer is already processed, and the remaining 4-bit data needs to be processed.

If the bit length the VLD is to read is greater than the bitoffset, an extra process is required. However, since the VLD buffer is in 8 bits, an access to the VLD buffer should be made every time for that extra process, which in turn deteriorates the processing speed. In addition, when handling a value in bits the overhead was increased at a byte memory boundary.

SUMMARY OF THE INVENTION

Accordingly, the present invention is directed to an apparatus and method for VLD buffer management that substantially obviates one or more problems due to limitations and disadvantages of the related art.

An object of the present invention is to provide a management apparatus of 32-bit double VLD buffers capable of reading a bitstream by byte unit and outputting the bitstream (and even values in many bits) in bit unit to a VLD without deterioration in processing speed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an apparatus for VLD buffer management for demodulating a variable length coded data from a transmitter side into a bitstream format and variable length decoding the data at a VLD, the apparatus comprising: a first and a second buffer, each having an N-byte size (N: an integer greater than 2); and a buffer controller for reading an input bitstream by byte unit, storing the bitstream in the first buffer, storing, if needed, the bitstream that is stored in the first buffer in the second buffer, reading from the second buffer a bitstream with a bit length required of the VLD by bit unit, and outputting the bitstream to the VLD.

Preferably, each of the first and second buffers has a 4-byte size.

In the exemplary embodiment, the buffer controller indicates by means of a top pointer a next bit position to be read in the first and second buffers, respectively, and increases the top pointer of the corresponding buffer as much as a bit length being read.

In the exemplary embodiment, if the top pointer of the second buffer is greater than the predetermined threshold pointer, the buffer controller shifts a bitstream after the top pointer of the second buffer to the left side as much as a byte unit to be read from the bitstream in the first buffer, reads from the first buffer a bitstream in the corresponding byte unit, and stores the bitstream from the first buffer in the second buffer.

In the exemplary embodiment, if the VLD receives the bitstream from the second buffer and needs to process a following bitstream and if the bit length required of the VLD is longer than the length of the bitstream after the top pointer of the second buffer, the buffer controller reads the bitstream starting at the top pointer of the second buffer and outputs the same to the VLD; transfers the bitstream stored in the first buffer to the second buffer, reads from the second buffer the bitstream as much as the remaining bit length, and outputs the bitstream from the second buffer to the VLD; and updates the top pointer of each of the first and second buffers.

In the exemplary embodiment, if the VLD only needs to see the value of the second buffer and if the bit length required of the VLD is longer than the length of the bitstream after the top pointer of the second buffer, the buffer controller reads the bitstream starting at the top pointer of the second buffer and outputs the same to the VLD; reads the bitstream starting at the top pointer of the first buffer as much as the remaining bit length, and outputs the bitstream to the VLD; and does not update the top pointer of each of the first and second buffers.

In another aspect of the present invention, there is provided a method for VLD buffer management for demodulating a variable length coded data from a transmitter side into a bitstream format, variable length decoding the data at a VLD, and controlling data input/output to/from first and second buffers with an N-byte size (N: an integer greater than 2), respectively, wherein the method including the steps of: reading an input bitstream by byte unit, and storing the bitstream in the first buffer; storing, if needed, the bitstream that is stored in the first buffer in the second buffer; and reading from the second buffer a bitstream with a bit length required of the VLD by bit unit, and outputting the bitstream to the VLD.

The method for VLD buffer management includes the further step of: indicating by means of a top pointer a next bit position to be read in the first and second buffers, respectively, and increasing the top pointer of the corresponding buffer as much as a bit length being read.

The method for VLD buffer management includes the further step of: if the top pointer of the second buffer is greater than the predetermined threshold pointer, shifting a bitstream after the top pointer of the second buffer to the left side as much as a byte unit to be read from the bitstream in the first buffer, reading from the first buffer a bitstream in the corresponding byte unit, storing the bitstream from the first buffer in the second buffer, and increasing the top pointer of each of the first and second buffers.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
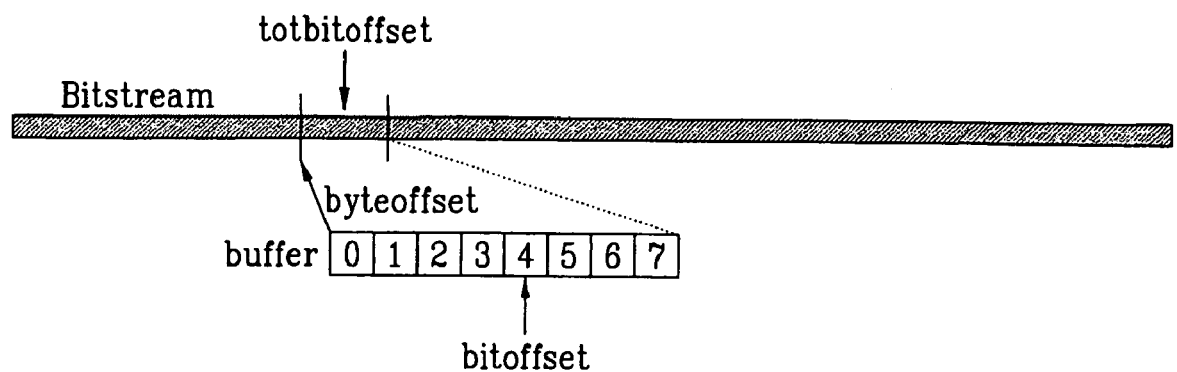
FIG. 1 illustrates a 1-byte VLD buffer management method according to a related art.
Figure 2:
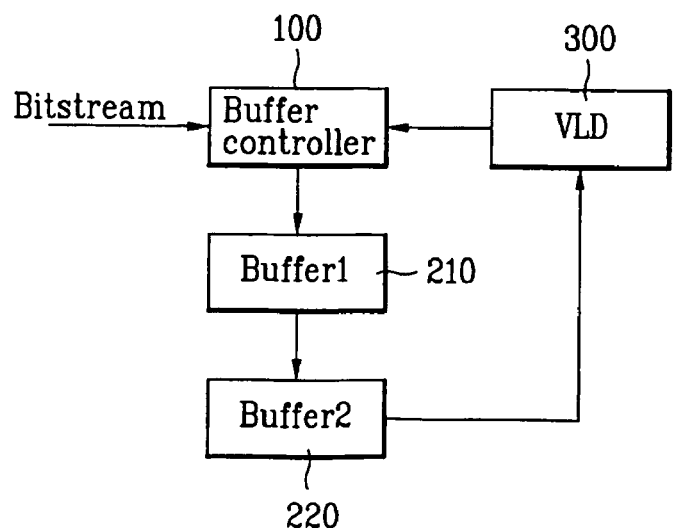
FIG. 2 illustrates an apparatus for VLD buffer management according to one embodiment of the present invention.

FIG. 2 is a schematic block diagram of an apparatus for VLD buffer management according to the present invention. As shown in FIG. 2, the apparatus includes a buffer controller 100, and 32-bit double buffers 210, 220.

The buffer controller 100 manages input/output of bitstreams of the first and the second buffer 210, 220.

That is, the buffer controller 100 reads an input stream by byte unit, stores the bitstream in the first buffer 210, and transfers the bitstream in the first buffer to the second buffer 220. At the request of the VLD 300, the buffer controller 100 reads the bitstream stored in the second buffer 220 by bit unit, and outputs the bitstream to the VLD 300.

Figure 3:
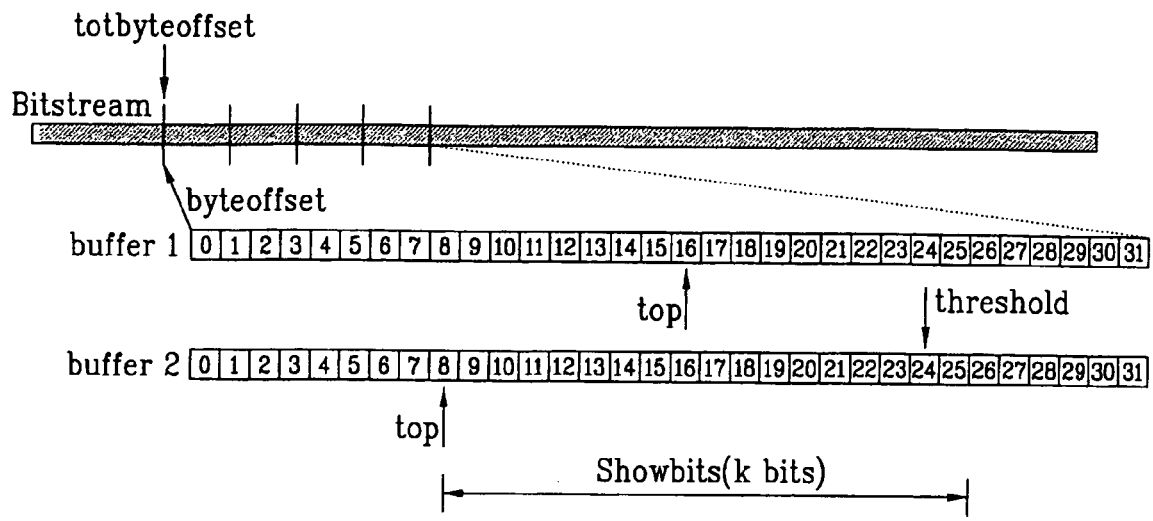
FIG. 3 illustrates a buffer management method using a first and a second buffer of FIG. 2.
Figure 4:
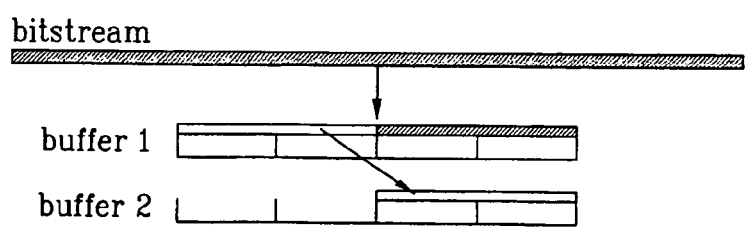
FIG. 4 illustrates a buffer management method when first and second buffers of FIG. 2 are empty.

FIG. 3 diagrammatically illustrates how the buffer controller 100 controls the storage and output of the bitstream in the first and the second buffer 210, 220.

The size of the first and the second buffer 210, 220 is 32 bits, i.e., 4 bytes, respectively. The VLD 300 makes a direct access mainly to the second buffer 220. Under the control of the buffer controller 100 the first buffer 210 stores the bitstream by 4 byte unit for the use in the second buffer 220. Each of the first and second buffers 210, 220 has a top pointer that indicates how much data in each buffer needs to be processed, and where to start reading the data.

For example, in FIG. 3, the top pointer of the first buffer 210 indicates '16'. It means that the first two bytes in the first buffer 210, or the data in front of the position of the 16 bits, are already processed. In other words, the data in the first two bytes are already outputted to the second buffer 220. Therefore, the bitstream starting at the top pointer is read and stored in the second buffer 220.

In FIG. 3, the top pointer of the second buffer 220 indicates '8'. It means that the data before the position of the 8 bits in the second buffer 220 are already read by the VLD 300. Therefore, the bitstream starting at the top pointer of the second buffer 220 is read as much as needed and outputted to the VLD 300.

A threshold pointer of the second buffer 220 is a pointer for reserving the number of bits to be used later. That is, if the threshold pointer is greater than the top pointer in the second buffer 220, the buffer controller 100 reads a data from the first buffer and stores the data in the second buffer 220.

In FIG. 3, totbyteoffset on the bitstream indicates a byte position of a bitstream to be read presently from the first buffer 210.

As described above the second buffer 220 stores a bitstream outputted from the first buffer 210 to enable the VLD 300 to perform variable length decoding on the bitstream.

Thus, the second buffer 220 enables the VLD 300 to read the value of bit length required of the VLD 300.

The following will now describe the management method of the first and second buffers 210, 220 to read the bit length required of the VLD 300.

1) At initial state where first and second buffers 210, 220 are all empty:

If a bitstream request is received from the VLD 300 while the first and second buffers 210, 220 are all empty, the buffer controller 100 reads up to 4 bytes from a bitstream in consideration of the capacity of the first buffer 210, and stores the bitstream in the first buffer 210. At this time, the totbyteoffset on the bitstream is increased by 4.

The buffer controller 100 reads then two bytes from the bitstream in the first buffer and stores the bitstream in the second buffer 220. The top pointer of the first buffer at this time indicates 16.

The buffer controller's reading the byte unit from the bitstream can be different depending on how it is designed. For examples, it can read one byte or two bytes or three bytes from the stream. Especially when the second buffer 220 is empty all of the four bytes can be read from the stream in the first buffer 210 and stored therein.

Figure 5:
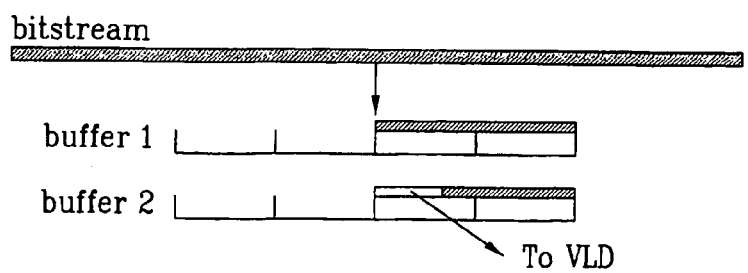
FIG. 5 illustrates a buffer management method when a bit length required of a VLD unit of FIG. 2 is shorter than the length of a bitstream stored in a second buffer.

2) When 'reqlen' (bit length requested of VLD 300) is shorter than bitstream length stored in second buffer 220:

As shown in FIG. 5, the buffer controller 100 reads reqlen from the bitstream in the second buffer 220 and outputs it to the VLD 300.

If the data is simply to be shown the top pointer is not increased. However, if the bitstream being read and the following bitstream should be processed later, the top pointer is increased as much as the bit length the top pointer has read.

When 'reqlen' is longer than length of bitstream in second buffer 220:

There can be two cases.

Figure 6A:
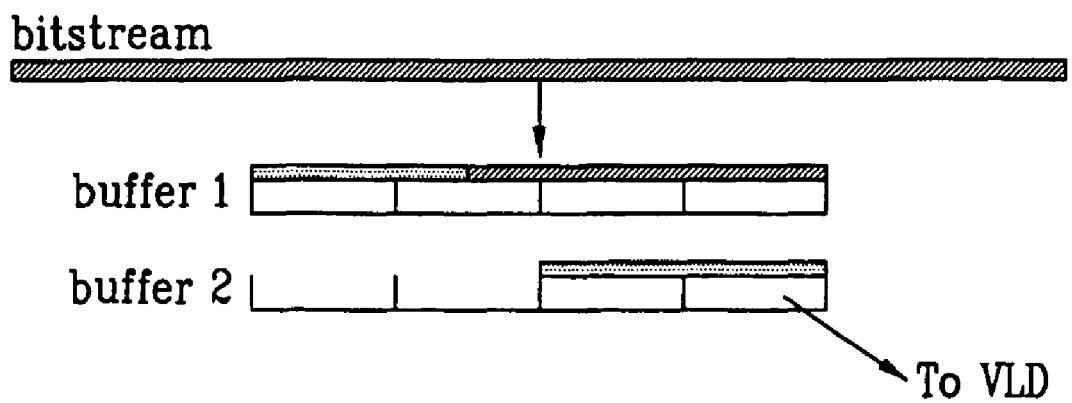
FIG. 6a and FIG. 6B illustrate, respectively, a buffer management method when a bit length required of a VLD unit of FIG. 2 is longer than the length of a bitstream stored in a second buffer.

First of all, there is a case that a bit value simply needs to be shown. In such case the top pointer is not increased. Therefore, the bitstream is read starting at the top pointer of the second buffer 220 as shown in FIG. 6a, and the following bitstream starting at the top pointer corresponding to the MSB (Most Significant Bit) in the first buffer 210 is read next.

Figure 6B:
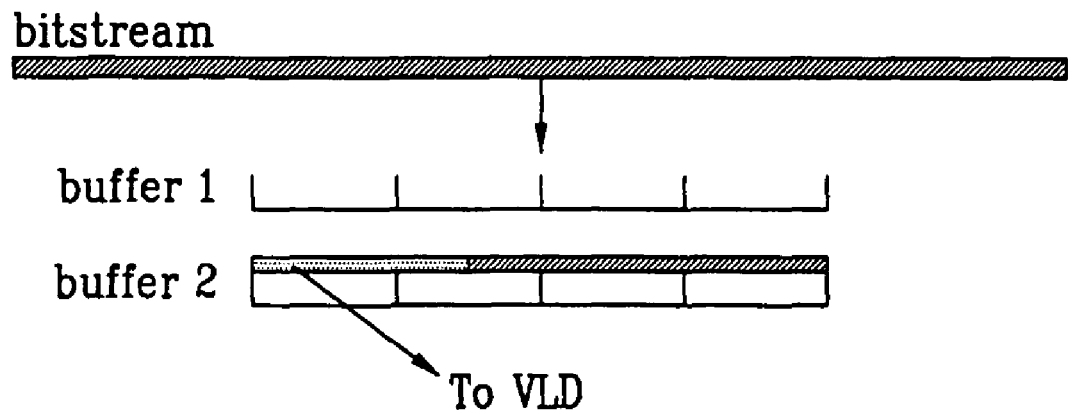

In the other case the top pointer needs to be increased. That is, the bitstream in the second buffer 220 is read and the following bitstream should be processed. In such case, the bitstream is read starting at the top pointer of the second buffer 220 and outputted to the VLD 300, as shown in FIG. 6b. Later the bitstream in the first buffer 210 is transferred to the second buffer 220 and read as much as the remaining capacity of the second buffer 220. The bitstream is then outputted to the VLD 300 and the top pointer is increased.

Figure 7A:
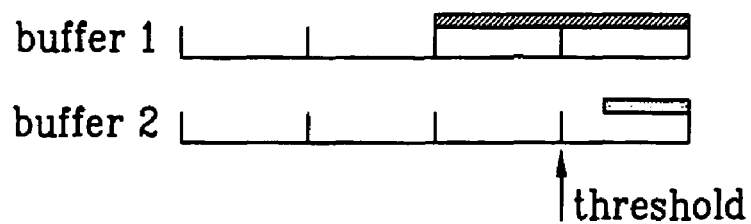
FIG. 7a and FIG. 7b illustrate, respectively, updating a second buffer in FIG. 2.
Figure 7B:

4) When second buffer 220 is updated:

Referring to FIG. 7a, if the predetermined threshold pointer of the second buffer 220 is greater than the value of the top pointer, the second buffer 220 is updated. That is, two bytes from the bitstream in the first buffer 210 is read and stored in the second buffer 220. At this time the remaining data in the second buffer 220 is shifted to the left side by two bytes, as shown in FIG. 7b and stored following the data having been read from the first buffer 210.

Figure 8:
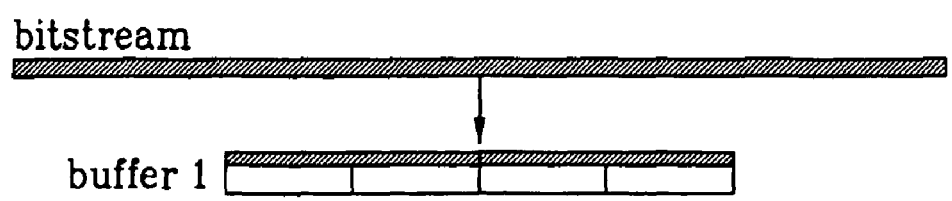
FIG. 8 illustrates updating a first buffer of FIG. 2.

And as shown in FIG. 8, four bytes from the bitstream are read to update the first buffer 210. Since the first buffer 210 should be uploaded in the second buffer 220 by two bytes, the top pointer of the first buffer 210 shifts by two byte unit.

The buffer size of each of the first and second buffers 210, 220 was assumed to be 32 bits in the present embodiment, but it was made by way of example. For instance, the size of the first and second buffers 210, 220 can be 2 bytes or three bytes, respectively, or greater than 5 bytes.

The terminology used here has been defined in consideration of functions given by the present invention, and can be changed according to the intention of a person skilled in the relevant art or usage. Therefore, the definitions of the terminology will have to be given on the basis of the description of the present invention.

Particularly, it is recognized that the teachings of the foregoing disclosure will suggest other modifications to those persons skilled in the relevant art. Such modifications may involve other features which are already known per se and which may be used instead of or in addition to features already described herein. The applicants hereby reserve the right to formulate new claims to such features and/or combinations of such features during the prosecution of the present application or of any further application derived therefrom.

In conclusion, according to the apparatus and method for VLD buffer management of the present invention, two 32-bit VLD buffers are used wherein the first VLD buffer is used for directly storing an input stream in bytes, and the second VLD buffer for reading and storing the bitstream from the first VLD buffer, reading the bitstream with the required bit length of the VLD by bit unit, and outputting it to the VLD.

Therefore, 32-bit data can be processed at once. The double VLD buffer structure also reduces the number of accesses to the VLD buffer and thus, the repetitive memory access procedure can be simplified for the VLD. In addition, by processing the large number of bit length (i.e., 32 bits) at once, the VLD process time can be considerably reduced.

Also, the present invention can be applied to other variable length decoders with a variety of lengths.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for Variable Length Decoder (VLD) buffer management for demodulating a variable length coded data from a transmitter side into a bitstream format and variable length decoding the data at a VLD, the apparatus comprising:
   a first and a second buffer; and
   a buffer controller configured to read an input bitstream by byte unit, store the bitstream in the first buffer, store at least a part of a bitstream that is stored in the first buffer in the second buffer, read from the second buffer a bitstream with a bit length required of the VLD by bit unit, and output the read bitstream to the VLD,
   wherein the buffer controller is configured to
      indicate, with a top pointer, a next bit position to be read in the first and second buffers, respectively, and increase the top pointer of the corresponding buffer as much as a bit length being read,
      read the bitstream from the first buffer and store the read bitstream in the second buffer, and
      update the top pointer of each of the first and second buffers if the top pointer of the second buffer is greater than a predetermined threshold pointer,
   wherein the second buffer is connected between the first buffer and the VLD, and
   wherein the predetermined threshold pointer indicates a bit position being shorter than a last bit position of the second buffer.

2. The apparatus according to claim 1, wherein each of the first and second buffers has a 4-byte size.

3. The apparatus according to claim 1, wherein the buffer controller increases the top pointer of the first buffer as much as a bit length of the stored at least a part of a bitstream.

4. The apparatus according to claim 1, wherein the buffer controller increases the top pointer of the second buffer as much as a bit length of the output bitstream.

5. The apparatus according to claim 1, wherein if the VLD needs a bitstream as a reference only, the buffer controller reads a bitstream from the second buffer and outputs the same to the VLD, and does not increase the top pointer of the second buffer.

6. The apparatus according to claim 1, wherein if the top pointer of the second buffer is greater than the predetermined threshold pointer, the buffer controller shifts a bitstream after the top pointer of the second buffer to the left side as much as a byte unit to be read from a bitstream in the first buffer, reads from the first buffer a bitstream in the corresponding byte unit, and stores the read bitstream from the first buffer in the second buffer.

7. The apparatus according to claim 1, wherein if the VLD receives the output bitstream from the second buffer and needs to process a following bitstream, and if the bit length required of the VLD is longer than a length of a bitstream after the top pointer of the second buffer, the buffer controller reads a bitstream starting at the top pointer of the second buffer and outputs the same to the VLD, transfers at least a part of a bitstream stored in the first buffer to the second buffer, reads from the second buffer the transferred at least a part of a bitstream as much as a remaining bit length, outputs the read bitstream from the second buffer to the VLD, and updates the top pointer of each of the first and second buffers.

8. The apparatus according to claim 1, wherein if the VLD only needs to see a value of the second buffer and if the bit length required of the VLD is longer than a length of a bitstream after the top pointer of the second buffer, the buffer controller reads a bitstream starting at the top pointer of the second buffer and outputs the same to the VLD, reads a bitstream starting at the top pointer of the first buffer as much as a remaining bit length, outputs the read bitstream to the VLD, and does not update the top pointer of each of the first and second buffers.

9. An apparatus for Variable Length Decoder (VLD) buffer management for demodulating a variable length coded data from a transmitter side into a bitstream format and variable length decoding the data at a VLD, the apparatus comprising:
a first buffer and a second buffer, each having a 4-byte size; and
a buffer controller configured to read an input bitstream by byte unit, store the bitstream in the first buffer, store at least a part of a bitstream that is stored in the first buffer in the second buffer, read from the second buffer a bitstream with a bit length required of the VLD by bit unit, and output the read bitstream to the VLD,
wherein the buffer controller is configured to
indicate, with a top pointer, a next bit position to be read in the first and second buffers, respectively, and increase the top pointer of the corresponding buffer as much as a bit length being read,
read the bitstream from the first buffer and store the read bitstream in the second buffer, and
update the top pointer of each of the first and second buffers if the top pointer of the second buffer is greater than a predetermined threshold pointer,
wherein the second buffer is connected between the first buffer and the VLD, and
wherein the predetermined threshold pointer indicates a bit position being shorter than a last bit position of the second buffer.

10. The apparatus according to claim 9, wherein if the VLD receives the output bitstream from the second buffer and needs to process a following bitstream, and if the bit length required of the VLD is longer than a length of a bitstream after the top pointer of the second buffer, the buffer controller reads a bitstream starting at the top pointer of the second buffer and outputs the same to the VLD, transfers at least a part of a bitstream stored in the first buffer to the second buffer, reads from the second buffer the transferred at least a part of a bitstream as much as a remaining bit length, outputs the read bitstream from the second buffer to the VLD, and updates the top pointer of each of the first and second buffers.

11. The apparatus according to claim 9, wherein if the VLD only needs to see a value of the second buffer and if the bit length required of the VLD is longer than a length of a bitstream after the top pointer of the second buffer, the buffer controller reads a bitstream starting at the top pointer of the second buffer and outputs the same to the VLD, reads a bitstream starting at the top pointer of the first buffer as much as a remaining bit length, outputs the read bitstream to the VLD, and does not update the top pointer of each of the first and second buffers.

12. A method for Variable Length Decoder (VLD) buffer management for demodulating a variable length coded data from a transmitter side into a bitstream format, variable length decoding the data at a VLD, and controlling data input/output to/from first and second buffers, the method comprising:
reading an input bitstream by byte unit, and storing the bitstream in the first buffer;
storing at least a part of a bitstream that is stored in the first buffer in the second buffer;
reading from the second buffer a bitstream with a bit length required of the VLD by bit unit, and outputting the bitstream to the VLD;
indicating, with a top pointer, a next bit position to be read in the first and second buffers, respectively, and increasing the top pointer of the corresponding buffer as much as a bit length being read,
wherein, when the increasing the top pointer, if the at least a part of the corresponding bitstream is read from the first buffer and stored in the second buffer, the top pointer of the first buffer is increased as much as the bit length being read from the first buffer, and
wherein the second buffer is connected between the first buffer and the VLD, and
wherein a predetermined threshold pointer indicates a bit position being shorter than a last bit position of the second buffer.

13. The method according to claim 12, wherein, in the increasing of the top pointer, if the output bitstream is read from the second buffer and outputted to the VLD, the top pointer of the second buffer is increased as much as the bit length being read from the second buffer.

14. The method according to claim 12, wherein, in the increasing of the top pointer, if the VLD needs a bitstream as a reference only, a bitstream from the second buffer is read and outputted to the VLD, and the top pointer of the second buffer is not increased.

15. The method according to claim 12, further comprising:
if the top pointer of the second buffer is greater than the predetermined threshold pointer, shifting a bitstream after the top pointer of the second buffer to the left side as much as a byte unit to be read from a bitstream in the first buffer, reading from the first buffer a bitstream in the corresponding byte unit, storing the read bitstream from the first buffer in the second buffer, and increasing the top pointer of each of the first and second buffers.

16. The method according to claim 12, further comprising:
if the VLD receives the bitstream from the second buffer and needs to process a following bitstream, and if the bit length required of the VLD is longer than a length of a bitstream after the top pointer of the second buffer, reading a bitstream starting at the top pointer of the second buffer and outputting the same to the VLD, transferring at least a part of a bitstream stored in the first buffer to the second buffer, reading from the second buffer the transferred at least a part of a bitstream as much as a remaining bit length, outputting the read bitstream from the second buffer to the VLD, and updating the top pointer of each of the first and second buffers.

17. The method according to claim 12, further comprising:
if the VLD only needs to see a value of the second buffer and if the bit length required of the VLD is longer than a length of a bitstream after the top pointer of the second buffer, reading a bitstream starting at the top pointer of the second buffer and outputting the same to the VLD, reading a bitstream starting at the top pointer of the first buffer as much as a remaining bit length, outputting the read bitstream to the VLD, and not updating the top pointer of each of the first and second buffers.

* * * * *